United States Patent [19]

Sudo et al.

[11] Patent Number: 4,902,526

[45] Date of Patent: Feb. 20, 1990

[54] PROCESS FOR PREPARING HIGH-FAT SOYBEAN MILK

[76] Inventors: Ryosei Sudo, 5-11, Hamuramachimatsubaracho 2-chome, Nishitama-gun, Tokyo; Toshimitsu Ueda, 306 A-1, Ninomiya, Akigawa-shi, Tokyo, both of Japan

[21] Appl. No.: 211,636

[22] Filed: Jun. 27, 1988

[51] Int. Cl.4 .................................................. A23L 1/36
[52] U.S. Cl. ....................................... 426/598; 426/629
[58] Field of Search ............... 426/598, 629, 801, 592, 426/44

[56] References Cited

U.S. PATENT DOCUMENTS

| | | | |
|---|---|---|---|
| 1,082,118 | 12/1913 | Gossel | 426/598 |
| 2,078,962 | 1/1937 | Miller | 426/598 |
| 3,288,614 | 11/1966 | Miles | 426/598 |
| 3,901,978 | 8/1975 | Nelson et al. | 426/598 |
| 4,041,187 | 8/1977 | Nelson et al. | 426/598 |
| 4,064,277 | 12/1977 | Yokotsuka et al. | 426/598 |
| 4,194,018 | 3/1980 | Hodel | 426/598 |
| 4,409,256 | 10/1983 | Johnson et al. | 426/598 |

OTHER PUBLICATIONS

Nelson 1976, Illinois Process for Preparation of Soymilk J. Food Science, 41:57.

Primary Examiner—Carolyn Paden
Attorney, Agent, or Firm—Jordan and Hamburg

[57] ABSTRACT

The present invention relates to a process for preparing high-fat whole soybean milk for use principally in the manufacture of processed food other than tofu. Mayonnaise, cheese-like products, or other food products having excellent physical properties can be obtained by the use of this milk.

4 Claims, No Drawings

PROCESS FOR PREPARING HIGH-FAT SOYBEAN MILK

BACKGROUND OF THE INVENTION

1. Field of the Invention

The present invention relates to a process for preparing high-fat whole soybean milk for use mainly in the manufacture of processed food other than tofu.

2. Definition of the Terms

High-fat whole soybean milk: High-fat whole soybean milk means the soybean milk obtained without the removal of okara, to which vegetable fat has been added at the time of preparation.

Okara: Okara means the residual solid obtained by the filtration or centrifugation of heated soybean milk. In the case of manufacturing tofu in Japan, it is usual way to remove okara that is the residual solid.

Extracted soybean milk: Extracted soybean milk means the soybean milk obtained from the soybean deprived of okara (ordinary soybean milk).

Whole soybean milk: Whole soybean milk means the soybean milk obtained from the soybean without the removal of the okara.

DESCRIPTION OF THE PRIOR ART

It is important above all in the preparation of soybean milk (extracted or whole soybean milk) which is to be utilized in processed food other than tofu to prevent the generation of beany flavor characteristic of soybean. It is known that the beany flavor is generated principally from aldehydes, ketones, and alcohols, which are formed by the reaction of lipid with lipoxydase in the beans when the soybean is ground. A principal method of obtaining soybean milk having less beany flavor (deodorization) comprises inactivating the lipoxydase by heating the soybean before grinding to thereby inhibit this reaction.

The following three methods of deodorizing soybean milk according to the above-described principle have heretofore been invented and put into practice.

(1) Cornell University Method (Food Technology 21, 1630 (1967))

Soybean is immersed not in cold water but in a 0.05N sodium hyroxide solution at 50° C. for 2 hours, fully washed with water, and ground at a high temperature with the addition of hot water, whereby lipoxydase is inactivated and the generation of beany flavor is prevented.

This method is, however, aimed at preparing not whole soybean milk but ordinary extracted soybean milk.

(2) The U.S. Department of Agriculture Method (U.S. Pat. No. 363129)

The method comprises a step of preparing whole fat soybean powder and a step of preparing soybean milk base (a material for soybean milk) therefrom. The step of preparing whole fat soybean powder comprises peeling soybean to remove the hull, heating (dry-heating) the soybean to inactivate lioxydase, adjusting the moisture, subjecting the soybean to extrusion-cooking in an extruder, and finely dividing to obtain whole fat soybean powder. The step of preparing soybean milk base comprises dispersing whole fat soybean powder in water, finely dividing and homogenizing the powder in a colloid mill and a homogenizer to obtain soybean milk and spray-drying the milk at about 130° to 140° C. to form a soybean milk composition. (The soybean milk prepared by this method will be hereinafter referred to as Department of Agriculture soybean milk). Although this milk contains okara, the hull is not utilized in it.

(3) The University of Illinois Method (U.S. Pat. No. 3901978)

The method comprises immersing soybean in water (usually an alkali solution having a pH value ranging from 7.5 to 8.5) and sufficiently heating it so that the soybean is tenderized until it exhibits a tenderometer value of between about 7.2 and 137 kg per 100 g of soybean and the lipoxydase is inactivated, and thereafter homogenizing a slurry having a soybean concentration of less than about 20% by weight at a pressure of about 70 to 703 kg/cm$^2$, whereby whole soybean milk is prepared. (The soybean milk prepared by this method is hereinafter referred to as Illinois soybean milk.

Among the three methods described above, the method (1) is excluded from the present discussion because it relates to a process for preparing not whole soybean milk but extracted soybean milk from which okara is removed. The methods (2) and (3) relate to a process for only preparing whole soybean milk from which okara is not removed, although beany flavor can be reduced, and are lacking in the art of preventing the denaturation of proteins contained in the whole soybean milk. The use of the whole soybean milk obtained by these methods in various processed food products, therefore, may result in the shortage in the gel formation ability (heat solidifiability) or oxidation resistance of the proteins, poor emulsifiability, or other disadvantages. More particularly, the processed food in which the soybean milk obtained by these methods are utilized is deteriorated in its quality because of the thermal denaturation of the soybean proteins caused by the large heat energy applied for easier grinding of soybean before the grinding step.

SUMMARY OF THE INVENTION

The present invention, which comprises consecutively step A wherein soybean is immersed in water for 12 hours or more; step B wherein the immersed soybean obtained in step A is ground at a temperature not lower than 80° C. until the soybean is slurried (a liquid containing ground soybean) containing finely divided particles of 50 $\mu$ or smaller; step C wherein a vegetable fat and an emulsifier are added to the slurry obtained in step B and the slurry is maintained under stirring for 3 to 10 minutes at 95° to 100° C.; and step D wherein the high-fat slurry obtained in step C is homogenized in an ultra-high pressure homogenizer at a pressure ranging from 400 to 1000 kg/cm$^2$ to convert the slurry into high-fat whole soybean milk, has been developed with the purpose of achieving the following effects:

(1) prevention of the thermal denaturation of the proteins, which can be accomplished by the omission of the heat treatment before the grinding of the soybean (step B)

(2) the provision of a process for the preparation of high-fat whole soybean milk, wherein an appropriate heat treatment is effected in a state in which the proteins in the liquid containing the ground soybean are protected by the vegetable fat (step C), whereby the obtained soybean milk can acquire favorable physical properties when it is utilized in various processed food products.

DETAILED DESCRIPTION OF THE PREFERRED EMBODIMENTS

Each of the steps of the process of the present invention will now be described in more detail.

Step A:

This step is one in which soybean is immersed and tenderized in water. The soybean must be immersed in water for at least 12 hours. Although heat treatment is made at a high temperature for a prolonged period in the Illinois University Method described previously, no heat treatment is involved in the method of the present invention, in order to avoid the denaturation of the proteins. Usually, intact soybean is used in the present invention, though peeled soybean (deprived of the rind) may also be used.

Step B:

In this step, the soybean tenderized by the immersion in water is ground at a temperature not lower than 80° C. and converted into a slurry containing particles of 50 $\mu$ or smaller. In this step, usually the water used for immersing the soybean in step A is wasted, and the immersed soybean is supplied into a grinder with hot water of not lower than 80° C. Temperature of at least 80° C. is necessary for the inactivation of lipoxydase. The soybean is usually ground with hot water having a temperature ranging from 80° to 100° C. Being ground at a high temperature of 80° C. or above, the lipoxydase contained in the soybean is inactivated in a moment without the generation of beany flavor. The soybean can be efficiently ground, for example, in a grinder to be finely divided into particles, first into coarse particles (200 $\mu$ or smaller) and then into fine particles (50 $\mu$ or smaller). The appropriate concentration of the slurry obtained in this step is within the range of 10 to 15%.

Step C

In this step, a vegetable fat and an emulsifier are added to the slurry containing finely divided particles of 50 $\mu$ or smaller, and the slurry is maintained under stirring at 95° to 100° C. for 3 to 10 minutes. The proteins are protected during the stirring by the vegetable fat. Any type of vegetable fat can be used, which generally includes palm oil, coconut oil, soybean oil, corn oil, and the like. Soybean lecithin, monoglyceride, sugar ester, sorbitan fatty acid ester, and the like can be used as the emulsifier. The vegetable fat is added in this step usually in an amount ranging from 3 to 40%, and the emulsifier from 0.1 to 1.0%. The proteins are appropriately stabilized in this step, which contributes towards the achievement of excellent physical properties as shown below.

Step D:

In this step, the high-fat slurry is homogenized in an ultra-high pressure homogenizer at a pressure ranging from 400 to 1000 kg/cm$^2$ to be converted into high-fat whole soybean milk. All the ingredients of the soybean are divided into such ultra-fine particles in this step that these particles never cause sedimentation during storage. Moreover, the emulsification of the vegetable fat added is completed in this step. Any type of ultra-high pressure homogenizers can be used as long as it can supply the maximum pressure of 400 to 1000 kg/cm$^2$. Manton-Gaulin type homogenizer was principally used in the experiments of the present invention.

EXAMPLE 1

180 kg of water was added to 60 kg of intact soybean (IOM soybean). After the soybean was immersed in the water overnight, it was stripped of the immersing water and supplied into a grinder with hot water at 93° C. to be ground until the particle size of the ground soybean was 200 $\mu$ or smaller (primary grinding). The ground soybean was again ground in the same grinder until the particle size became 50 $\mu$ or smaller. The solid content was simultaneously adjusted to 11% (secondary grinding). The obtained slurry was supplied into a pasteurizer, whereto palm oil in an amount of 10% based on the total amount and soybean lecithin in an amount of 0.3% of the same were added and stirred in a high-speed blender for 10 minutes. The obtained high-fat slurry was then homogenized in a Manton-Gaulin type ultra-high pressure homogenizer at a pressure of 600 kg/cm$^2$ to produce high-fat whole soybean milk.

The results of the comparison of the thus obtained high-fat whole soybean milk (hereinafter referred to as the soybean milk of the present example) with the soybean milk samples obtained by the Department of Agriculture Method and by Illinois University Method are as follows:

(1) Curdling ability (gel formation)

The solid content of each soybean milk sample was adjusted to 12%. GDL (gulucono-$\delta$-lactone) was added thereto in an amount of 0.40% based on the soybean milk and mixed. The aliquot partion of each mixture was poured into a container, hermetically sealed, heated in hot water of 90° C. for 45 minutes and then cooled overnight. The solidified samples were cut into rectangular parallelopipeds of 20 mm in thickness, 80 mm in length, and 40 mm in width, and subjected to the determination of hardness of gel with a Reometer (manufactured by Fudo Kogyo Co., Ltd.) at a sample temperature of 10° C. These soybean milk samples were also subjected to the determination of sulfhydryl groups. The results are shown in Table 1 (the tables are collectively shown at the end of the specification).

The soybean milk of the present example showed outstandingly high values both in the gel strength and the sulfhydryl group content.

As another example, a cheese-like product was prepared from these soybean milk samples according to the following formation to determine the gel strength of them.

| | |
|---|---|
| soybean milk | 70% |
| palm oil | 25% |
| lactic acid | 0.6% |
| malic acid | 0.3% |
| stabilizer | 0.3% |
| salt | 0.4% |
| flavoring material | 3.2% |
| perfume | 0.2% |

From these materials, soybean milk and vegetable fat were heated at 70° C. in a melting cooker and mixed with other materials (additives). The mixture was put into a box and cooled. The results of the determination of the gel strength, together with the pH values, are shown in Table 2. It can be clearly understood from this Table that a cheese-like product having high hardness can be obtained from the soybean milk of the present example.

(2) Emulsion stability (determined by the method described in Agric. Biol. Chem., 46 (1), 91–96 (1982))

Each soybean milk sample, the solid content of which was adjusted to 12%, was mixed with salad oil of soybean at a volume ratio of 35:65. The mixture was homogenized in a homogenizer, packed in test tubes, and left to stand for 24 hours in a constant temperature bath maintained at 37° C. 2.5 ml portions of the samples were then taken from the bottom of the test tubes to determine the water contents, from which the emulsion stabilities of the samples were calculated according to the following formula:

$$\frac{100 - \text{water content after 24 hours}}{100 - \text{initial water content}} \times 100 = \text{emulsion stability (\%)}$$

The results of the determination are shown in Table 3. The soybean milk of the present example shows excellent emulsion stabilities at any of the pH values.

As another example, mayonnaise sauce was prepared from these soybean milk samples according to the following formulation to determine the emulsion stability of them.

| | |
|---|---|
| soybean milk | 30% |
| salad oil | 67% |
| vinegar | 2% |
| salt | 1.2% |
| sugar | 0.5% |
| monosodium glutamate | 0.5% |
| mustard powder | 0.3% |
| pepper | 0.1% |
| coloring material | 0.5% |

These materials except salad oil were preliminarily stirred in a mixer (manufactured by Kenwood Corp.), whereto the salad oil was added slowly at a rate of about 100 ml/min. The mixture was emulsified in a table colloid mill at 15,000 rpm to prepare mayonnaise sauce.

The emulsion stability was tested according to the vibrating centrifugation method (Nippon Shokuhin Kougyo Gakkaishi Vol. 25, No. 9, p 531 (1978)). The results are shown in Table 4. It can be understood that the mayonnaise sauce made from the soybean milk of the present example is outstandingly excellent in emulsifiability.

It was found that the high-fat whole soybean milk obtained by omitting step C of the process of the present invention, that is not containing vegetable fat and not maintained under stirring for 3 to 10 minutes at a temperature ranging from 95° to 100° C., and in the later step adding vegetable fat to the whole soybean milk (hereinafter referred to as soybean milk containing vegetable fat added afterwards), was deteriorated in applicability to processed food due to the absence of the proteins function character, compared with the high-fat soybean milk obtained by the method of the present invention. Cheese-like products were made from these two soybean milk samples under substantially the same conditions as described above to determine the gel strength of them. The results are shown in Table 5, from which it is clear that the high-fat whole soybean milk of the present invention shows high gel strength.

Accordingly, it can be understood that the vegetable fat must be added in step C of the process of the present invention. And it can be also understood that maintenance under stirring for 3 to 10 minutes at a temperature ranging from 95° to 100° C. as mentioned above is very important. This step C is critical to the method of the present invention for improving the soybean proteins properties. The existing methods of the U.S. Department of Agriculture Method soybean and the University of Illinois Method soybean do not adopt step C at all.

As understood from the previous paragraphs, compared with the U.S. Department of Agriculture Method soybean and the University of Illinois Method soybean, the present invention adds vegetable fat and incorporates a heated treatment appropriately before the homogenizing process. Therefore, soybean milk in which the disadvantages of the conventional soybean milk relating to beany flavor, protein solidifiability, and emulsion stability are overcome, can be easily obtained by the process for the preparation of high-fat whole soybean milk provided by the present invention. The high-fat whole soybean milk of the present invention, which contains large quantities of dietary fiber is remarkably excellent from the standpoints of nutrition and food rheology. The highfat whole soybean milk of the present invention can be widely applied as raw material for various processed food products, which has been difficult conventionally.

TABLE 1

| | hardness of gel (g/cm$^2$) | sulfhydryl groups 10$^{-6}$ M/g protein |
|---|---|---|
| soybean milk of the present example | 105 | 3.8 |
| Department of Agriculture soybean milk | 25 | — |
| Illinois soybean milk | 40 | 0.2 |

TABLE 2

| | hardness of gel (g/cm$^2$) | PH |
|---|---|---|
| soybean milk of the present example | 200 | 4.9 |
| Department of Agriculture soybean milk | 8.5 | 4.8 |
| Illinois soybean milk | 120 | 5.0 |

TABLE 3

| PH | soybean milk of the present example | Department of Agriculture soybean milk | Illinois soybean milk |
|---|---|---|---|
| 3 | 30 | 20 | 28 |
| 4 | 82 | 25 | 60 |
| 5 | 88 | 45 | 80 |
| 6 | 28 | 32 | 30 |
| 7 | 30 | 21 | 26 |

TABLE 4

| vibrating time (minutes) | 30 | 60 | 90 |
|---|---|---|---|
| separated oil of soybean milk of the present example (g) | 1.33 | 1.58 | 2.09 |
| separated oil of Department of Agriculture soybean milk (g) | 2.25 | 2.79 | 3.16 |
| separated oil of Illinois soybean milk (g) | 2.23 | 2.85 | 3.10 |

TABLE 5

| content of palm oil (%) | kind of soybean milk | hardness of gel (g/cm$^2$) | reaching time of equilibrium gel-strength |
|---|---|---|---|
| 0 | soybean milk of the present invention | 104 | 30 |
|  | soybean milk containing vegetable fat added afterwards | 82 | 36 |
| 5 | soybean milk of the present invention | 113 | 37 |
|  | soybean milk containing vegetable fat added afterwards | 98 | 42 |
| 8 | soybean milk of the present invention | 119 | 42 |
|  | soybean milk containing vegetable fat added afterwards | 102 | 46 |
| 10 | soybean milk of the present invention | 127 | 47 |
|  | soybean milk containing vegetable fat added afterwards | 107 | 51 |

What is claimed is:

1. A process for preparing high-fat whole soybeam milk which comprises the folllowing consecutive steps A to D:

step A, immersing soybean in water for 12 hours or more without heat treatment to avoid denaturation of proteins in said soybean;

step B, grinding the soybean which has been immersed in step A at a temperature of not lower than 80° C. to inactivate lipoxydase and to form a slurry having a solids content of 10 to 15% containing finely divided soybean particles of 50 μ or smaller;

step C, adding a vegetable fat in an amount ranging from 3 to 40% and an emulsifier in an amount ranging from 0.1 to 1% to the slurry obtained in step B and maintaining the mixture under stirring for 3 to 10 minutes at a temperature ranging from 95° to 100° C. to form a high-fat slurry, the vegetable fat protecting and stabilizing the protein during stirring; and step D, homogenizing the high-fat slurry obtained in step C in an ultra-high-pressure homogenizer at a pressure ranging from 400 to 1000 kg/cm$^2$ to produce high-fat whole soybean milk possessing improved curdling property, gel strength and emulsion stability without the removal of okara.

2. A process as in claim 1, wherein said soybean is ground in step B in hot water having a temperature ranging from 80° to 100° C.

3. A process as in claim 1, wherein said soybean in step B is first ground into coarse particles of 200 μ or smaller and then ground into finer particles of 50 μ or smaller.

4. A process as in claim 1, wherein said vegetable fat is selected from the group consisting of palm oil, coconut oil, soybean oil and corn oil, and said emulsifier is selected from the group consisting of soybean lecithin, monoglyceride, sugar ester and sorbitan fatty acid ester.

* * * * *